United States Patent Office 3,446,407
Patented May 27, 1969

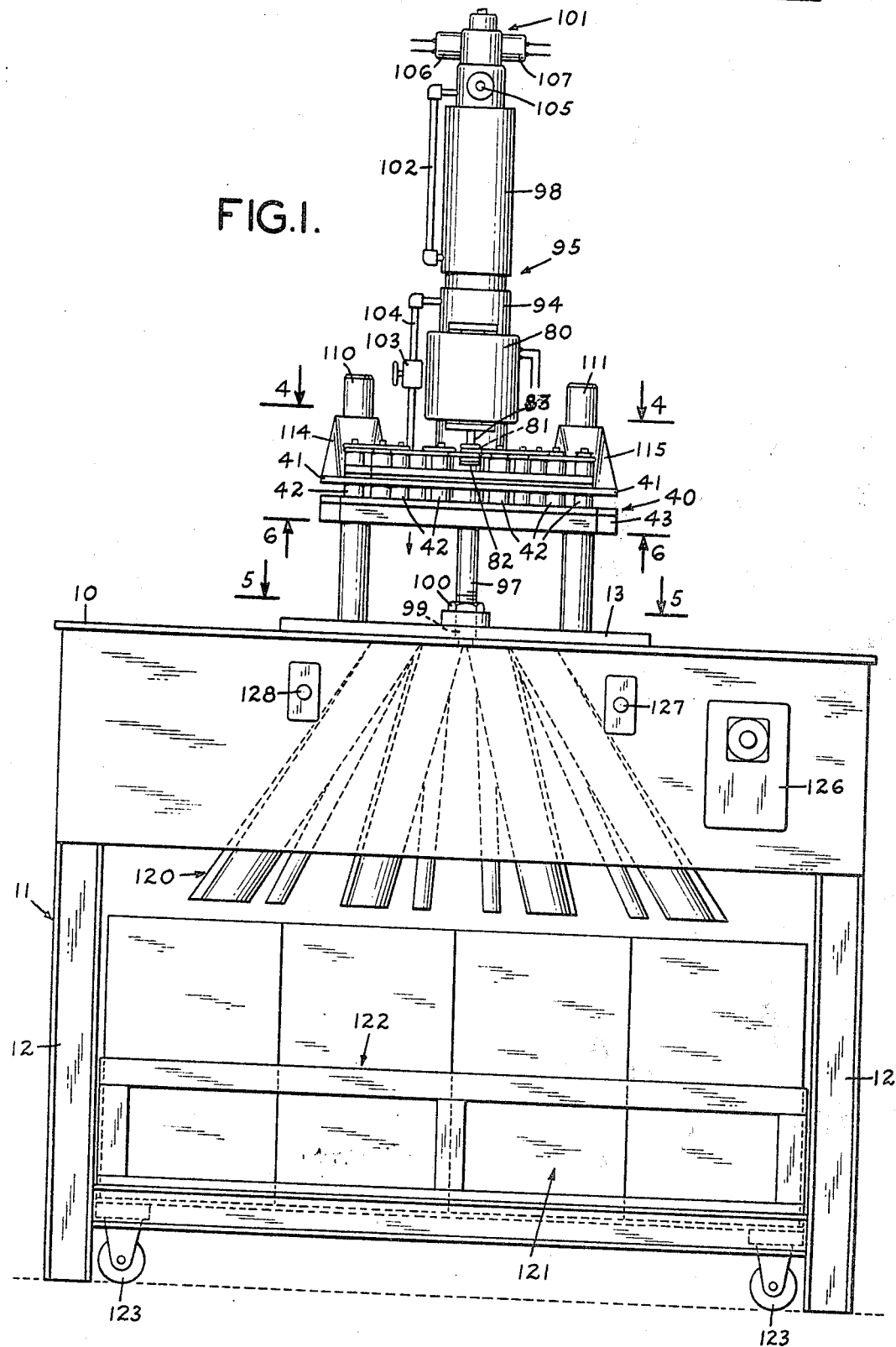

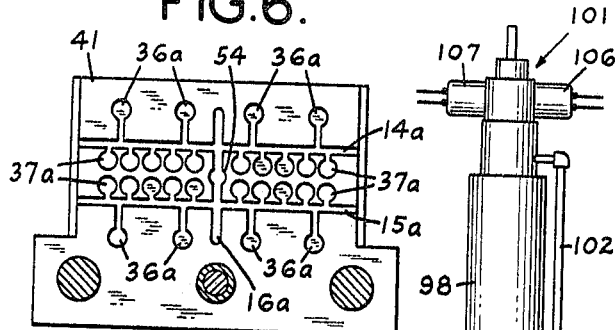
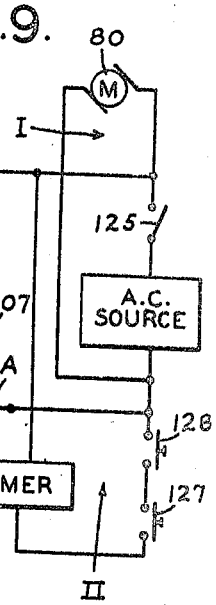
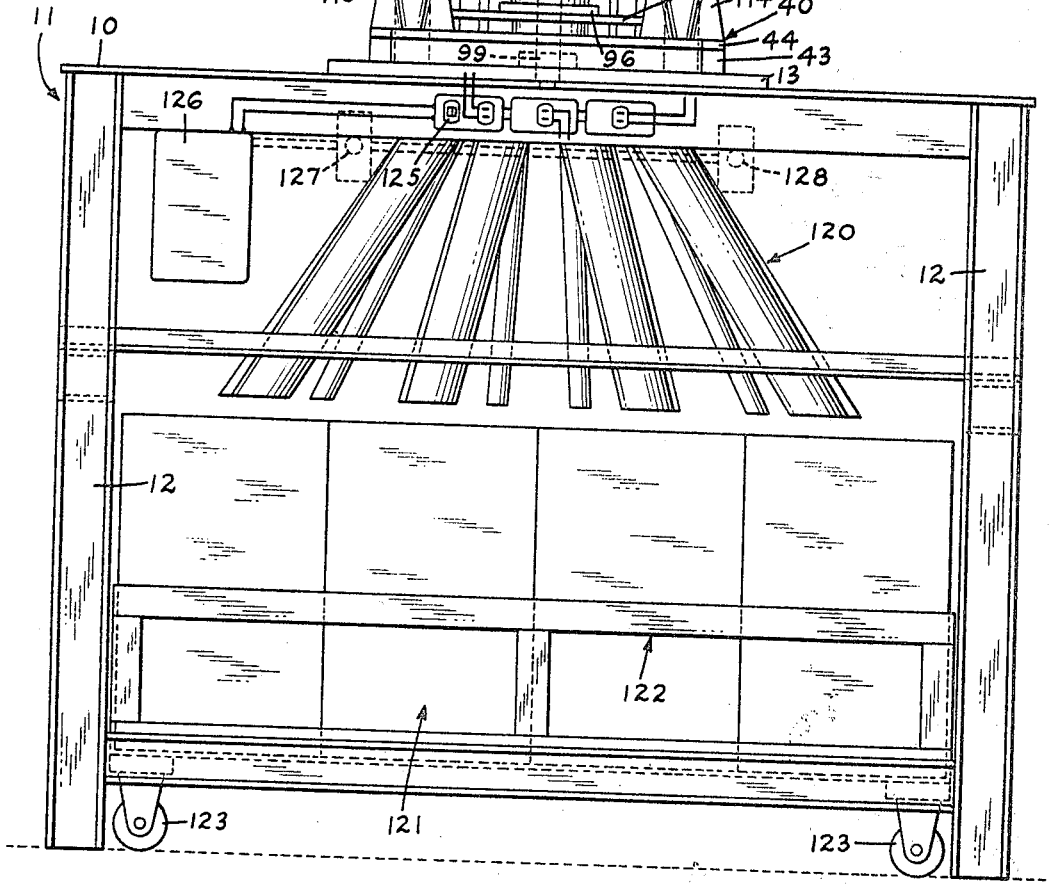

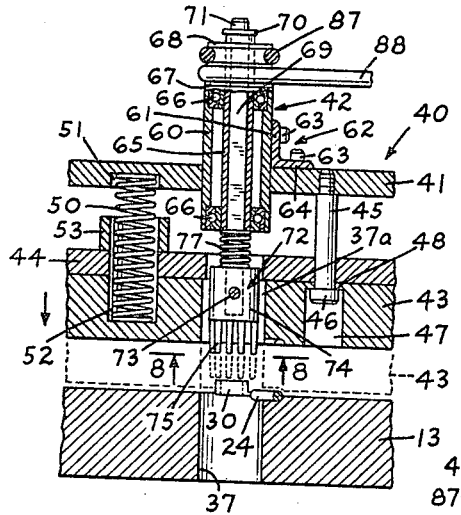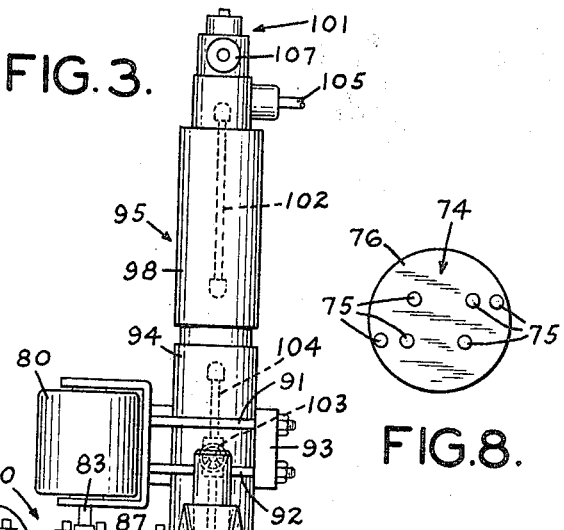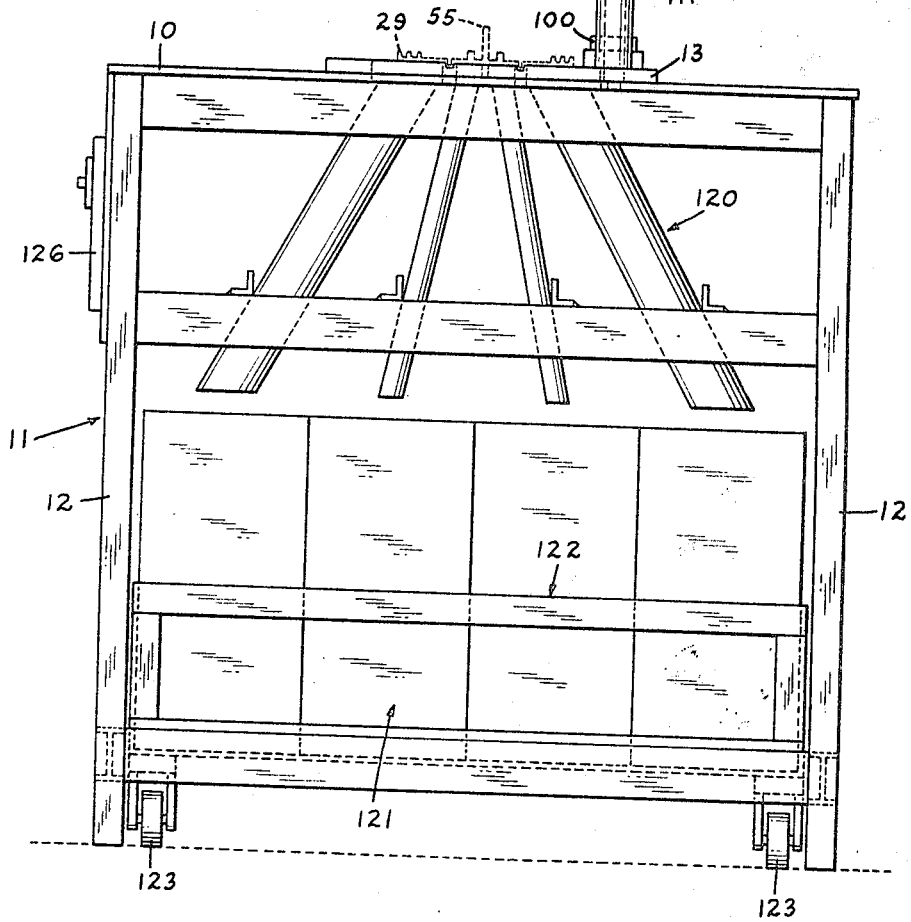

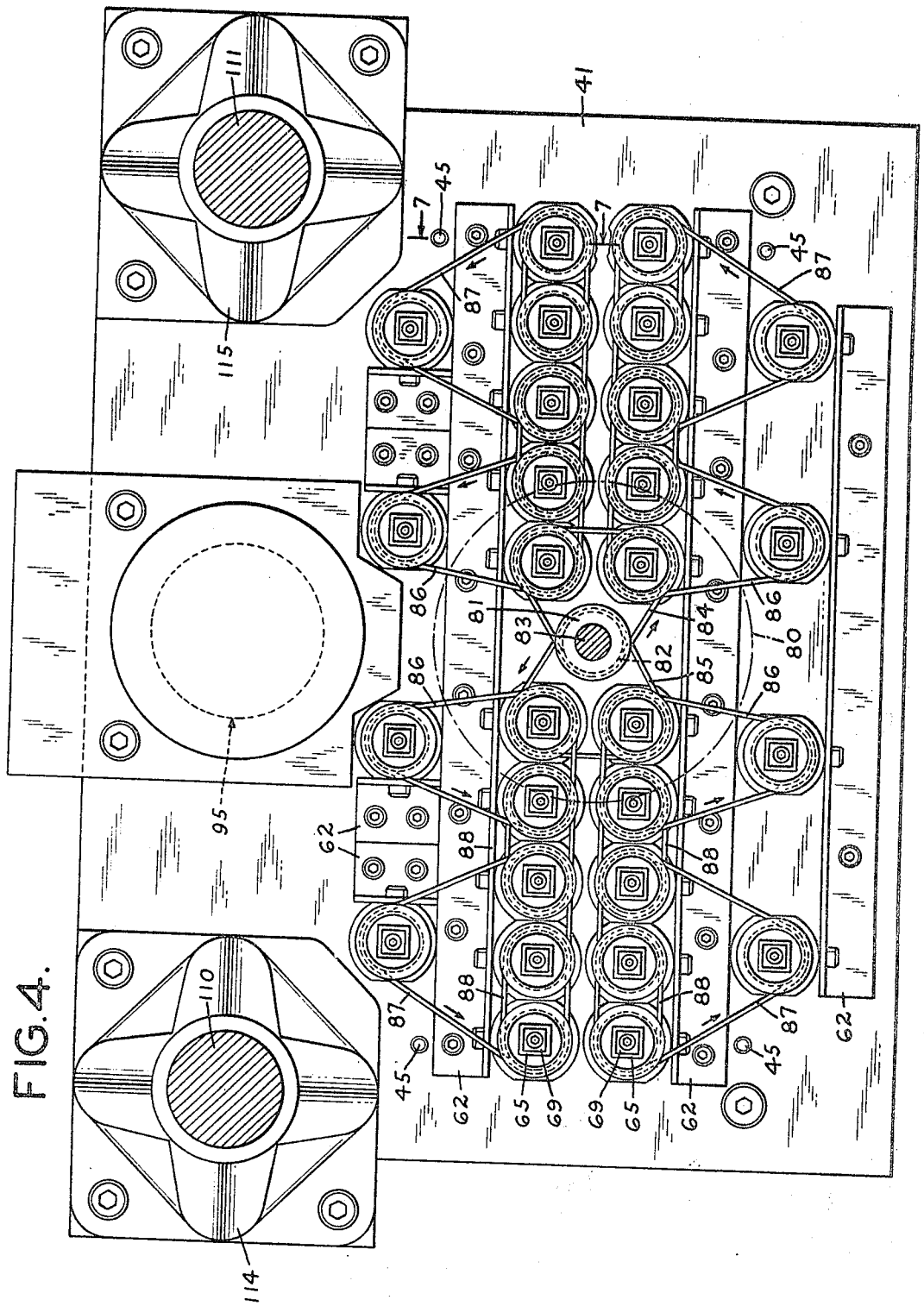

3,446,407
MACHINE FOR SEPARATING MOLDED PLASTIC ARTICLES FROM GATES AND RUNNERS OF MOLDED TREES
Douglas Martin Dawson, Miami, Fla., assignor to Russell, Burdsall & Ward Bolt and Nut Company, Port Chester, N.Y., a corporation of New York
Filed May 22, 1967, Ser. No. 639,951
Int. Cl. B26f 3/00, 3/02; B65h 35/00
U.S. Cl. 225—97        12 Claims

ABSTRACT OF THE DISCLOSURE

Machine for separating molded articles from a molded plastic tree on which said articles are attached to gates which extend from the runners, the machine comprising an upper and lower platen, one of which is movable to open and to closed clamping position, the lower platen having a plurality of spaced holes in which the articles lie when the tree is placed between the platens, the upper platen mounts a plurality of rotatable brush-like sweepers in registry with the holes; the sweepers contacting and knocking the articles from the gates when the platens are moved to closed position with the tree clamped therebetween.

---

This invention relates to power driven machines for separating molded plastic articles from the runners and gates that are formed as an integral part of the molded plastic casting in the course of molding the plastic products in a multiple cavity mold.

In producing molded articles of thermoplastic material in a molding machine having a number of mold cavities in the shapes of the articles to be formed, it is conventional to provide runner conduits and branching gates through which the plastic material in molten condition is flowed into the mold cavities. These conduits may be referred to as runner channels from which gate channels branch, the branch gate channels connecting the runner channels with the mold cavities. It is common practice to provide the molding machine with a number of mold cavities which may all be the same so that a number of like articles may be molded at the same time or a number of mold cavities, each differing from the others, so that a number of articles differing from each other may be molded at one time during one cycle of the molding machine. After the molten thermoplastic is charged to the molds through the sprue channel, the runner channels and the gate channels and the thermoplastic becomes cooled and solidified, this operation forms, what is called in the parlance of the trade, a "tree." The tree comprises the molded articles which are attached to the ends of the gates, which in turn are attached to the runners. After the tree with the molded articles on it is formed, the molds of the molding machine are opened and the tree removed.

It is then necessary to separate the molded articles from the tree. The trunk and branches of the tree, i.e. the runners and branching gates, after separating the molded articles, may then be returned to the charge that is charged to the molding machine. The articles on the tree may be gears, washers, rings, specially shaped parts, etc. In fact, there is an innumerable variation of plastic-material articles and shapes that are produced in a plastic molding plant. When separated from the tree, the articles of the same kind, as additional trees are formed upon successive cycles of the molding machine, must be collected in separate receivers or containers, so that the molded articles are sorted in a manner that like articles are collected together and not mixed with other and different articles. This operation of separating the articles from the tree and the sorting may be done manually, but this is time consuming and expensive. Also, there are machines disclosed in the prior art which are intended to do this mechanically, but some such machines as are available are often crude and inefficient, and others are so cumbersome or inefficient that they do not fully meet the requirements of present day mass production requirements.

This invention provides a power driven machine for separating the plastic articles from the tree, i.e. the runners and gates or necks. A separating machine embodying the invention may be operated in conjunction with a multiple cavity molding machine, and the articles are removed from the tree with a clean separation and without leaving an unwanted projection on the article, and when separated from the tree, the articles are sorted so that articles of like kind separated in successive cycles of the machine are passed to their separate collecting or receiving containers or bins.

In accordance with the invention a stationary platen is mounted on a suitable supporting structure or frame; the stationary platen having channels or grooves in its upper surface connecting with apertures which extend through the stationary platen; the grooves being positioned or laid out in the same pattern as the runners and gates of the molded plastic tree. The apertures are positioned so that when the tree is placed on the stationary platen with the runners and gates registering with and lying in the grooves, the molded articles are positioned in the apertures which extend through the stationary platen. Mounted on the frame for vertical reciprocating movement above the stationary platen is a movable platen for clamping a tree in proper registry on the stationary platen. The reciprocatable platen has apertures registering with the apertures in the stationary platen and carries power driven brush-like rotatable sweepers positioned in these apertures. When the movable platen is moved downwardly from its uppermost normal position to its lowermost or clamping position, the runners and gates of the tree are rigidly clamped between the upper and lower platens and the rotating sweepers contact the molded articles on the tree and separate them from the tree by knocking them off at the juncture of the gate and article. The separated articles fall downwardly through the apertures in the stationary platen into chutes communicating with the apertures; the articles then passing through the chutes to selected receiving bins beneath the platen. Power means, preferably a fluid operated cylinder, is provided for moving the clamping platen to its upper or normal position to give access to the top of the stationary platen to place on it a tree from which the molded articles are to be separated and for removing the "skeleton" tree from the machine after the movable platen has completed a cycle and the molded articles have been separated from the tree. And power means, preferably an electric motor, is provided on the upper platen for rotating the sweepers.

Although the novel features which are believed to be characteristic of the invention are pointed out in the annexed claims, the invention itself as to its objects and advantages and the manner in which it may be carried out, may be better understood from the more detailed description which follows, taken in connection with the accompanying drawings forming a part hereof, in which:

FIG. 1 is a front view in elevation of a preferred form of a machine, embodying the invention;
FIG. 2 is a rear view in elevation;
FIG. 3 is a side view in elevation;
FIG. 4 is a plan view of a portion of the machine showing the arrangement of the rotatable brush-like sweepers and means for rotating them, on line 4—4 of FIG. 1;
FIG. 5 is a plan view of a portion of the machine showing the runner and gate grooves and apertures in the fixed platen on line 5—5 of FIG. 1; the tree with the molded articles on it being shown in broken lines;

FIG. 6 is a view to smaller scale to illustrate the bottom surface of the clamping plate, forming a part of the reciprocatable platen assembly;

FIG. 7 is a fragmentary view in section of a rotatable brush-like sweeper, showing its relation to the movable platen assembly and fixed platen;

FIG. 8 is an end view of a brush-like sweeper element showing a preferred arrangement of the sweeper tines; and FIG. 9 is a wiring diagram showing an electrical hook-up for timed operation of the machine.

Figure 5:
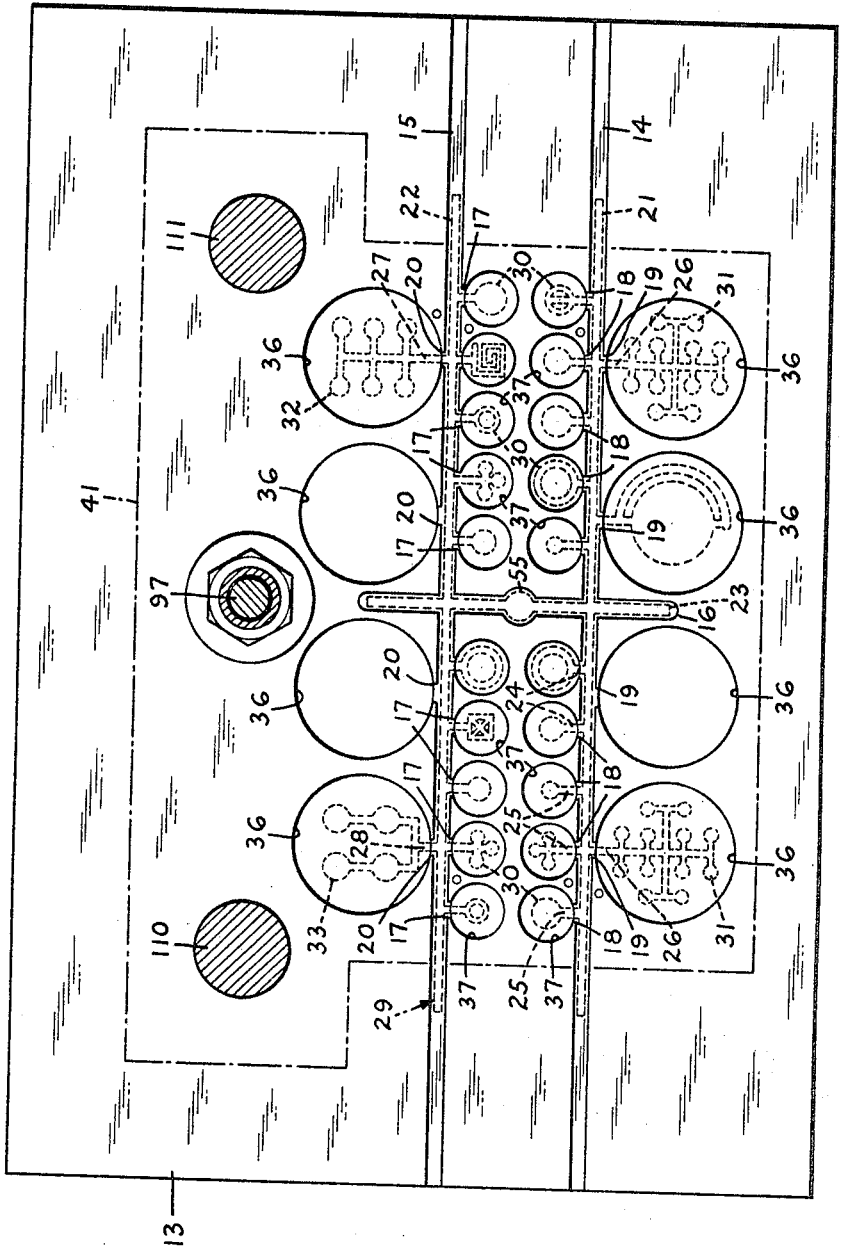

Referring now to the drawings, in which like reference characters indicate similar parts throughout the several views, a horizontally disposed stationary table top 10 is mounted on a frame 11 constructed of suitable structural members, including supporting legs 12. The table supports a stationary or fixed platen plate 13. The upper surface of the plate 13 (see FIG. 5) is provided with a pattern of connecting runner grooves 14, 15, 16 and branching gate grooves 17, 18, 19, 20 to match the pattern of the runners 21, 22, 23 and gates 24, 25, 26, 27, 28 of the tree 29 to which molded articles 30, 31, 32, 33 are connected. It will, of course, be understood that the tree is the product from the multi-cavity molding machine in which the thermoplastic articles have been produced. It will also be manifest to those skilled in the art that the plastic molded articles are formed at the outer ends of the gates and that these articles may be of various shapes and sizes. It is common practice to reduce the cross-section of the gate at its outer end where it joins with the article to provide a weaker joint so that the articles are more easily broken away from the tree. In the event that there are a number of small articles of the same kind molded with a plurality of small gates, such as illustrated at 31 (see FIG. 5), these may be separated from the tree as a unit, and these units collected in a bin and the articles subsequently separated from the little gates by known means, such for example, as a tumbling mill.

The stationary platen 13 is provided with a plurality of apertures extending through the platen and dimensioned and positioned so that the molded articles on the tree lie in these apertures when the tree is placed on the platen with its runners and gates lying in the grooves. As shown, there are two rows of larger apertures 36 and two rows of smaller apertures 37, the size and position of these apertures and the grooves having been predetermined to match the pattern of the tree that is produced in the molding machine.

The upper or vertically movable platen assembly 40 is secured to a fluid pressure cylinder so that the platen is raised to its uppermost or normal position, as shown in FIGS. 1 and 3, and to its lowermost or clamping position, as shown in FIG. 2, in response to the upward or retraction stroke of the fluid pressure cylinder and in response to the downward or forward stroke of the cylinder, respectively. The platen assembly 40 (FIGS. 1, 2, 3, 7) comprises an upper sweeper mounting plate 41 on which are mounted a plurality of rotatable sweeper assemblies 42, described in further detail later on. A clamping plate 43 integrally secured to an intermediate plate 44 is mounted on a plurality of suspension bolts 45 so that the clamping plate 43 has vertical movement upwardly toward and downwardly away from the sweeper mounting plate 41; there being four suspension bolts 45, one at each corner of the plate 41 (see FIGS. 4 and 7). The suspension bolts at their upper ends are threaded into suitable threaded bores in plate 41. The lower ends of the suspension bolts are provided with a head 46. The shanks of the bolts slidably extend through bores in the intermediate plate 44. The heads 46 of the bolts are slidable in larger diameter bores 47 in the clamping plate. As shown in FIG. 7, inturned annular shoulder 48 on the plate rests upon the annular upper face of the bolt head 46. It will now be seen that the clamping plate may move vertically within limits by sliding vertically on shank 45 and when the upper platen assembly is in its uppermost normal position, the clamping plate is spaced therefrom and is held by the heads 46 of the bolts 45. Mounted between the sweeper mounting plate 41 and the clamping plate 43 at each of the four corners of plate 41 is a compression spring 50, the upper end of which seats in a recess 51 in plate 41, and the lower end of which seats in a recess 52 in the clamping plate. These springs urge the clamping plate downwardly away from the plate 41 and they permit the plate 41 to move toward the clamping plate 43 when the clamping plate, during the downward movement of the upper platen assembly 40, reaches the stationary platen 13. The downward movement of the sweeper mounting plate 41 toward the clamping plate is limited by a spacer ring 53 serving as a stop.

The lower surface of clamping plate 43 (see FIG. 6) is provided with runner grooves 14a, 15a, 16a, gate grooves, and apertures 36a, 37a, which register with the corresponding runner grooves 14, 15, 16, gate grooves, and apertures 36, 37 in the stationary platen plate 13 (see FIG. 5). This plate has an aperture 54 to receive the sprue 55 of the tree 29.

As mentioned above, a plurality of sweeper assemblies 42 are mounted on the sweeper mounting plate 41. There is such an assembly for each of the apertures 36a, 37a through the reciprocatable upper platen clamping plate 41 and their registering apertures 36, 37 in the lower stationary platen plate 13. Inasmuch as the assemblies 42 are of like construction, it will suffice to describe only one as typical (see FIG. 7). The sweeper assembly 42 comprises an outer cylindrical sleeve 60 which is fixedly secured to the plate 41. As shown, a row of sleeves is secured to an upstanding flange 61 of an angle iron 62 by means of stud screws 63, or by other suitable means, such as welding; the other flange 64 being securely fastened to the plate at a place intermediate the ends of the sleeve. A hollow sleeve 65, square in cross-section, is mounted in a ball bearing 66 at each end of the sleeve 60. Hence, the hollow square sleeve 65 may rotate in the ball bearings 66, while the outer sleeve 60 remains fixed to the plate 41. The hollowed square sleeve extends upwardly beyond the upper end of fixed cylindrical sleeve 60 and two sheave pulleys 67, 68, one above the other, are fixedly secured to the rotatable square sleeve 65. A slidably fitted spindle 69 of square cross-section extends through the hollow square sleeve 65. This spindle at its upper end, which extends beyond the upper end of the square sleeve, is provided with a removable retainer washer or ring 70 which is held in place by means of a screw 71 threaded into a bore in the upper end of the spindle. Securely mounted on the lower protruding end of square spindle 69 is a brush-like sweeper element 72, which is removably secured to the spindle by a set screw 73.

The brush-sweeper element 72 comprises a cylindrical body portion 74 from which depend a plurality of fairly rigid tines 75; these tines having some resiliency or flexibility. This brush-sweeper 72 may be of a molded plastic material such as polyethylene or nylon or other plastic which will provide tough, fairly rigid, yet resilient tines or "bristles" 75. It will be observed in FIG. 8 that the tines 75 are positioned so that they lie concentrically, and some lie toward the periphery of the bottom face 76 of the body portion of the brush-sweeper.

Surrounding the square spindle 69 is a compression spring 77 seated at its upper end against the lower end of the rotatable hollow square sleeve 65 and seated at its lower end against the upper end face of the body 74 of the brush-sweeper element 72. This spring resiliently urges the body 74 downwardly away from the sleeve 65. When the upper platen assembly is moved downwardly from its normal position and there is a tree clamped between the upper and lower platen plates, the spring 77 permits the brush-sweeper to bounce upwardly, should it meet a resistant obstruction when it contacts the molded article on the tree in the operation of knocking off the article from the tree. In many instances this bouncing up and down is very advantageous in separating molded articles from the tree.

Power means are provided for rotating the pulleys 67, 68, which rotate the square hollow sleeves 65, which in turn rotate the square spindles 69 and hence the brush-sweepers 72 are rotated on their vertical axes. And power means are provided for raising the upper platen plate to uppermost normal position and to lower it so that the rotating brush-sweepers will contact the molded articles on a tree clamped between the upper and lower platens to separate the molded articles from the tree by knocking them off from the tree at the juncture where the gates are joined to articles. The means for rotating the brush-sweepers comprises an electric motor 80 having suitable sheave drive pulleys 81, 82 secured to its shaft 83, and endless belts 84, 85, 86, 87, 88 suitably trained over the pulleys 67, 68 secured to the square sleeves 65. While pulleys and endless belts are shown for illustrative purposes, it will be understood that any suitable equivalent means may be provided for rotating the brush-sweepers 72, such, for example, as gear teeth sprockets mounted on the motor shaft and spindles and sprocket chains suitably trained over the gear teeth sprockets.

The motor 80 is mounted on a bracket, having clamping arms 91, 92, and saddle 93, which clamp the motor securely to the reciprocating front cylinder part 94 of a compressed air cylinder 95 which is vertically mounted; the reciprocating front cylinder part 94 of the cylinder being secured at its outer or front end 96 of mounting plate 41 (see FIG. 2). The air cylinder 95, as shown, is of a type well known and available in the market and it is deemed unnecessary to describe it in minute detail. Suffice it to say that the piston rod 97 is stationary and the front cylinder 94 and the rear cylinder 98 move up (or rearwardly) and down (or forwardly) relatively to the stationary piston rod 97, which is secured at its outer end 99 to stationary platen 13 by a threaded connection and a locknut 100. The air cylinder is provided at its top or rear end with a solenoid operated, four way valve 101 which is also of known construction. The rear cylinder 98 operates on compressed air, the four way valve 101 introducing air back of the piston to move the cylinder part upwardly; the air in front of the piston escaping through a connecting line 102, and through the four way valve and in the reverse stroke the compressed air is moved in the opposite direction, as well known to those skilled in the art. The front cylinder part 94 is provided with hydraulic liquid, such as oil, and flow from front to rear and vice versa is controlled by a valve 103 in a pipe 104 connecting with the front and rear of the front cylinder 94. This type of air cylinder is advantageous because it provides smooth reciprocation of the upper platen without jarring or shocking impacts. A compressed air line 105, connected with a source of compressed air (not shown) is connected to the four way valve 101. The solenoids 106, 107 are connected in an electric circuit, as described later on.

A pair of vertically disposed guide posts 110, 111 are secured at their lower ends to the stationary platen 13. These guide posts extend through bores 112, 113 in the upper platen plates with a snug but slidable fit. Hollow boss bushings 114, 115 secured to the upper surface of the platen plate strengthen the structure and provide additional means for maintaining the structure in alignment.

Mounted on the frame 11 beneath the table top 10 are a plurality of delivery chutes, referred to generally by reference character 120. The upper end of each individual chute communicates with one of the apertures 36, 37 in the stationary platen 13, and the delivery ends are spaced so that each delivery end leads to a separate receiving bin of a plurality of receiving bins 121, which are carried on a dolly cart 122 having roller wheels 123, so that it may be rolled to receiving position under the table top and rolled away when desired. It will now be seen that after the molded articles are knocked off from the tree, by the rotating brush-sweepers, the individual separated articles are delivered and are received in their repective receiving bins 121 in sorted condition.

The motor 80 is connected into an electrical circuit and the platen assembly is also provided with an electrical circuit for automatic timed cyclic operation of the movable platen. Compressed air line 105 is connected to a source (not shown) of compressed air. With all valves and switches in normal position, the air cylinder 98 and oil cylinder 94 will be in their uppermost or normal position ready to begin a cycle of the machine. A circuit I in which the electric motor 80 is connected is then closed by closing switch 125, and the motor operates to rotate the hollow sleeve spindles 65, which rotate the spindles 69, which in turn rotate the brush-sweepers 72. The solenoid valves 106, 107 are connected into an electric circuit II provided with a timer 126 and push-button switches 127, 128, relays, etc. These switches are normally open. When these switches 127, 128 are in their normal open position, the air cylinder 98 and the oil cylinder 94 are in their uppermost position. That is, the platen plate 43 is in the position shown in broken lines 49 (see FIG. 2), and the plattens are open. When open, this permits the operator to place a molded tree 29 on the stationary platen, with the runners 21, 22 and their branching gates in the corresponding runner grooves 14, 15, and gate grooves in the stationary platen. The cross-sectional areas of the grooves are such that when the upper platen finally is in its lowermost position, the runners and gates of the tree are rigidly clamped between the upper and lower platens; the articles at the ends of the gates lying in the apertures 36, 37.

The upper platen will remain in normal, upper position until both starter push-buttons are depressed to close circuit II. When these buttons are depressed, this cuts off current from solenoid 106 and solenoid 107 is energized so that four way valve 101 is adjusted to cause compressed air to escape from the upper end of cylinder 98 and to enter its forward end thus driving the cylinder in downward direction, because the piston in this type of air cylinder is stationary. At the same time, when the switches 127, 128 are closed, this actuates the timer 126, which is preset for the desired time cycle. To prevent the cylinder 98 from acting too rapidly, it is connected to oil cylinder 94 in which the pipe 104 is connected to the front and rear end. By regulating the flow area of valve 103, the flow of oil in cylinder 94 is controlled to produce a smooth operation. The platen 43 moves downwardly and the clamping platen reaches and clamps the tree rigidly between the platens. The compression springs 50, at each corner, resiliently urge the platen 43 against the tree 29 and lower platen with the desired clamping pressure to maintain the runners and gates of the tree rigidly clamped without injury to the molded plastic product. The tines of the rotating brush-sweepers 72 contact the molded articles at the outer ends of the gates (see molded article 30, FIG. 7) and separate them from the gates by knocking them off; the separated articles then passing through their respective chutes 120 into their respective receiving bins 121, under the table 10. The upper platen 43 will remain in contact with the lower platen 13 until the timer has run its cycle, and then all valves and switches, etc. return to normal position and the cylinders 98 and 94 return to their uppermost position, leaving the platens open, until such time as the operator removes the "skeleton" tree and places another tree in position for separating the molded articles. Then the operator depresses starter push-buttons 127 and 128 to repeat the cycle. Although it is manifest that one starter push-button would be operative, it is preferred, as a safety measure, to employ two in the circuit and spaced apart so as to require the operator to use both hands to start the upper platen in its downward movement. This discourages placing a hand between the platens at a time when the platen might move and cause injury to the workman.

It will be understood that the wiring diagram of FIG. 9 is much simplified but a more elaborate one is deemed unnecessary because it is within the knowledge and capacity of those skilled in the electrical arts to make the required electrical hook-up with devices readily available in the market.

The terms and expressions which have been employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A machine for separating molded articles from a tree on which the articles are molded, said tree having one or more runners from which extend gates to which the molded articles are attached at their outer ends which comprises a frame, a pair of platens comprising an upper and a lower platen mounted on said frame, one of said platens being movable toward the other to closed position and away from said other to open position, registering means on said platens having a pattern corresponding to the pattern of the runners and gates of said tree to receive said runners and gates, apertures through said lower platen connecting with the said registering means, said apertures being spaced to receive the molded articles attached to said gates, means to move one of said platens to closed position for clamping said tree between said platens in registry with said registering means with the articles lying in said apertures, sweeper members mounted on the upper one of said platens operative to contact the molded articles in said apertures to separate said articles from their attached gates on moving the movable platen to closed position.

2. A machine for separating molded plastic articles from a tree on which the articles are molded, said tree having one or more runners from which extend gates to which the molded articles are attached at their outer ends, which comprises a frame, a pair of platens comprising an upper and a lower platen mounted on said frame, one of said platens being movable toward the other to closed position and away from said other to open position, runner and gate grooves in said platens having a pattern corresponding to the pattern of the runners and gates of said tree to receive said runners and gates, apertures through said lower platen connecting with the gate grooves and spaced to receive the molded articles attached to said gates when said runners and gates are placed in said grooves, means operative to move the movable platen to closed position for clamping said tree between said platens with the articles lying in said apertures, rotatable sweeper members mounted on the upper of said platens in registry with said apertures and operative to contact the molded articles to separate said articles from their attached gates when said platens are closed.

3. A machine according to claim 2, in which the lower one of said pair of platens is mounted on said frame is stationary position and said upper platen is mounted for vertical reciprocatable movement and which includes rotatable sweeper mechanisms for each of said apertures, each of said sweeper mechanisms comprising means mounting a vertically disposed spindle for rotation, said spindle having an upper and a lower end, the lower end of said spindle being in registry with and movable into the apertures in said lower platen, a brush-sweeper element secured to the lower end of said spindle for rotation with said spindle, spindle driving power means mounted for reciprocation with said upper platen and connected to rotate said spindles and brush-sweeper elements.

4. A machine according to claim 3, in which said means to move the upper vertically reciprocatable platen comprises a fluid pressure cylinder connected to said upper platen and the spindle driving means comprises an electric motor having a rotatable shaft, and drive means connecting said shaft with said spindles to rotate said spindles in response to rotation of said shaft.

5. A machine according to claim 4, which includes an electric circuit supplying power to said motor and an electric circuit including a timer for controlling the operation of said fluid pressure cylinder to reciprocate said upper platen through a cycle in a predetermined time.

6. A machine according to claim 4, in which said reciprocatable platen comprises an upper platen plate having apertures therein registering with the apertures in said lower platen and a sweeper mounting plate above said upper platen plate, and means resiliently securing said mounting plate to said upper platen plate; and in which each of said rotatable spindles is mounted for rotation in a sleeve fixed to said mounting plate.

7. A machine according to claim 6, which includes an electric circuit supplying power to operate said motor and an electric circuit including a timer controlling the operation of said fluid pressure cylinder through a forward and rearward stroke cycle in a predetermined time, said upper platen moving in response to operation of said cylinder.

8. A machine according to claim 6, which includes vertical guide posts fixed to the stationary lower platen and said upper platen includes bores through which said guide posts extend, said upper platen being slidable up and down on said guide posts.

9. A machine according to claim 6, in which a plurality of downwardly extending delivery chutes are mounted on said frame beneath said stationary lower platen, the upper ends of said chutes registering with selected apertures in said lower stationary platen and the lower ends of said chutes being positioned to register with selected receiving bins.

10. A machine according to claim 6, in which the brush-sweeper elements secured to the lower ends of the rotatable spindles each comprises a body portion from which a plurality of tines extend downwardly.

11. A machine according to claim 6, which includes an electric circuit supply power to said motor, said fluid operated cylinder is operated by compressed air, the flow of compressed air into and out of said cylinder being controlled by a two solenoid four way valve, and which includes an electric circuit including a timer for controlling the operation of said solenoids in a timed cycle.

12. A machine for separating molded plastic articles from a tree on which the articles are molded, said tree having a plurality of runners from which extend branching gates to which the molded articles are attached at their outer ends which comprises a frame, a lower horizontally disposed stationary platen plate mounted on said frame, an upper horizontally disposed reciprocatable platen plate above said stationary platen plate, a sweeper mechanism mounting plate above said upper platen plate, means resiliently mounting said upper platen plate on and beneath said sweeper mounting plate, a compressed air cylinder having a stationary piston secured to said stationary platen plate, a compressed air cylinder part movable on said piston and secured to said mounting plate, said upper platen plate being moved downwardly from normal open position to its lowermost closed position in response to the forward stroke of said cylinder part and to normal uppermost open position in response to the rearward stroke of said cylinder part, runner and gate grooves in said stationary platen plate and upper platen plate corresponding to the pattern of the runners and gates of said tree, the gate grooves in said lower platen plate connecting with apertures extending through said stationary platen and spaced to receive the molded articles attached to said gates when said tree is placed in registry with said runner and gate grooves, said upper and lower platen plates clamping said tree between them when said upper platen is moved to its lowermost closed position with said articles lying in said apertures, a brush-sweeper mechanism for each of said apertures mounted on said sweeper mounting plate in registry with said apertures, each of said mechanisms comprising an outer sleeve secured to said mounting plate, a hollow sleeve mounted for rotation in said outer sleeve, a spindle rotatable with said rotatable hollow sleeve and resiliently mounted for up and down slidable movement in said rotatable sleeve and extending into its registering aperture when said platen plates are in closed position, a brush-sweeper element having a body portion fixed to the lower end of said spindle, and having tines extending downwardly from said body portion, motor means rotating all of said spindles and said brush-sweeper elements, said tines contacting and separating said articles from their attached gates and knocking them off of said tree upon downward movement of said upper platen plate to closed position, and delivery chutes beneath said lower platen plates, the upper ends of which register with selected apertures for delivering the separated articles to selected receivers.

References Cited

UNITED STATES PATENTS

| | | | |
|---|---|---|---|
| 2,572,537 | 10/1951 | Taylor | 93—36 |
| 3,172,588 | 3/1965 | Bertold et al. | 225—93 |

JAMES M. MEISTER, *Primary Examiner.*

U.S. Cl. X.R.

225—93